Figure 1:
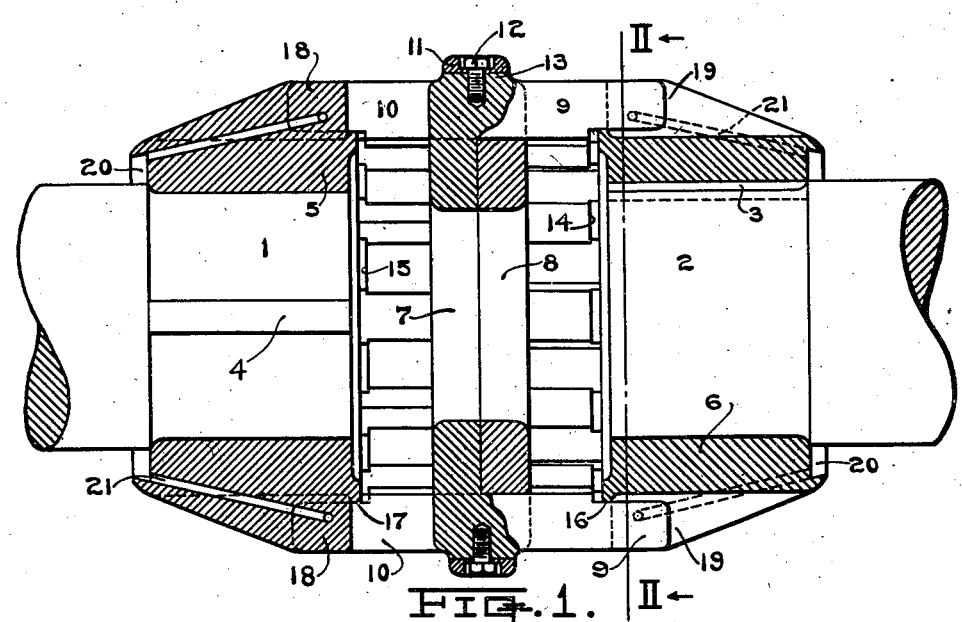

W. H. LIEBER.
SHAFT COUPLING.
APPLICATION FILED JUNE 18, 1910.

1,007,363.

Patented Oct. 31, 1911.

WITNESSES —
Ella Brickell
John E. Osmer

W. H. Lieber INVENTOR —
BY
ATTORNEY.

UNITED STATES PATENT OFFICE.

WILLIAM H. LIEBER, OF MILWAUKEE, WISCONSIN, ASSIGNOR TO ALLIS-CHALMERS COMPANY, OF MILWAUKEE, WISCONSIN, A CORPORATION OF NEW JERSEY.

SHAFT-COUPLING.

1,007,363. Specification of Letters Patent. Patented Oct. 31, 1911.

Application filed June 18, 1910. Serial No. 567,589.

*To all whom it may concern:*

Be it known that I, WILLIAM H. LIEBER, a citizen of the United States, residing at Milwaukee, in the county of Milwaukee and State of Wisconsin, have invented a certain new and useful Improvement in Shaft-Couplings, of which the following is a specification.

This invention relates to improvements in the construction of couplings and particularly to improvements in the construction of flexible couplings adapted to connect two movable members, such as rotating shafts, the coupling being removable in order to disconnect the members.

An object of the invention is to provide a coupling adapted to connect two movable members, such as rotating shafts, which is simple in construction, efficient in operation, and which can be easily removed if it is desired to disconnect the coupled members.

Another object is to provide a coupling which embodies the above enumerated desirable features and which will in addition permit the coupled members to shift slightly relatively to each other, the driving connection between the members being undisturbed during such shifting.

A clear conception of one embodiment of the invention can be obtained by referring to the accompanying drawing in which like reference characters designate the same or similar parts in like or different views.

Figure 2:
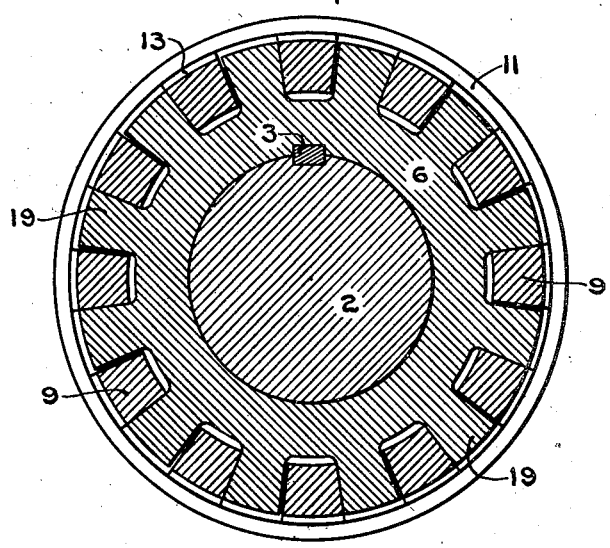

Figure 1 is a central vertical section through a shaft coupling showing its connection to two fragmentary shaft ends. Fig. 2 is a transverse vertical section of the device shown in Fig. 1, the section being taken on the line II—II of Fig. 1 looking in the direction of the arrows.

The shafts 1, 2, which may however be members other than shafts adapted to be connected for the purpose of transmitting motion from one to the other, are shown practically coaxial with each other and are mounted in bearings, not shown, in which they are adapted to be rotated. The coupling end member 5, which closely fits the overhanging end of the shaft 1, is keyed or otherwise fastened to the shaft 1 by means of keys 4. A series of outwardly projecting radial lugs 18 are formed in one with the end member 5 at the periphery thereof, and extend to within a short distance from the end of the member 5 on the coupling side thereof. The coupling end member 6, which closely fits the overhanging end of the shaft 2, is keyed or otherwise fastened to the shaft 2 by means of keys 3. A series of outwardly projecting radial lugs 19 are formed in one with the end member 6 at the periphery thereof, and extend to within a short distance from the end of the member 6 on the coupling side thereof. As shown, the end members 5, 6, are constructed exactly alike, making them interchangeable with each other.

The oil pockets 20 which are formed in the end members 5, 6, on the shaft sides thereof, are connected with the driving surfaces of the lugs 18, 19, respectively, by means of passages or conduits 21 which extend outwardly from the pockets 20.

The disk member 8 has a series of radially and laterally projecting lugs or claws 10 formed thereon which extend away from the disk member 8 toward the end member 5 and shaft 1. The ends of the claws 10 register with the spaces formed between consecutive lugs 18 of the member 5. The claws 10 have shoulders 15 formed on their inner sides, which shoulders limit the distances to which the claws 10 extend intermediate the lugs 18. The shoulders 15 are formed on the claws 10 adjacent the surfaces 17, along which surfaces the claws normally loosely coact with the periphery of a short outwardly projecting flange formed at the coupling end of the member 5. The disk member 7 has a series of radially and laterally projecting lugs or claws 9 formed thereon which extend away from the disk member 7 toward the end member 6 and the shaft 2. The ends of the claws 9 register with the spaces formed between consecutive lugs 19 of the member 6. The claws 9 have shoulders 14 formed on their inner sides, which shoulders limit the distances to which the claws 9 extend intermediate the lugs 19. The shoulders 14 are formed on the claws 9 adjacent the surfaces 16, along which surfaces the claws normally loosely coact with the periphery of a short outwardly projecting flange formed at the coupling end of the member 6.

The disk member 7 is intermediate the disk member 8 and the shaft 1, while the member 8 is intermediate the member 7 and the shaft 2. With such positioning of the disk members 7, 8, it is necessary that the claws 9, 10, formed on the members 7, 8, respectively, pass the disk member adjacent in order to coact with their respective end members 6, 5. In so passing the disk members 7, 8, the claws 9 formed on the member 7, coact in the spaces formed between consecutive claws 10 of the member 8, thus producing an interlocking of the members 7, 8, which can be broken only by endwise sliding of the members 7, 8, relative to each other. The members 7, 8, as shown, are formed exactly alike, thereby making them interchangeable with each other. It will also be noted that these members 7, 8, have an opening formed through the center of each. This opening is not essential and merely reduces the metal in, and hence the weight of the members 7, 8, thereby reducing the cost of construction.

The binding ring 11 coacts against the outer surface of a flange 13 formed on the members 7, 8, being held in position by means of the cap screws 12. These cap screws 12 are screwed one in each adjacent claw 9, 10, thus preventing endwise sliding of the members 7, 8, relatively to each other. It is however not essential to have the coaction of the members 7, 8, maintained by the use of the ring 11 and cap screws 12, as shown, since any other convenient means for accomplishing the same end might be substituted.

During construction of the coupling, the end members 5, 6, are bored to the desired diameter, after which they are placed on an arbor and the outer surfaces rough turned. The surfaces 17, 18, are then turned to accurate diameters, thus completing the lathe work necessary for these elements. The slots formed between the consecutive lugs 18, 19, are then milled, after which the keyways are formed, thus completing the construction of the members 5, 6, with the exception of the drilling of the holes or conduits 21. The disk members 7, 8, and ring 11, are similarly bored, turned, milled and drilled to the proper dimensions, after which the coupling is ready to be assembled.

In assembling the coupling, the end members 5, 6, are fitted upon the ends of the shafts 1, 2, respectively, and are fixed in position by means of the keys 4, 3. The disk members 7, 8, are then placed so that the overhanging ends of the claws 10 of the member 8 coact in the spaces formed between consecutive claws 9, but do not project beyond the outer surface of the disk member 7, and vice versa. With the members 7, 8, thus positioned, a cylinder having a diameter equal to the outer diameter of the members 7, 8, and a length equal to the length of the claws 9, 10, is formed. As the length of the claws 9, 10, and hence of the cylinder, is slightly less than the distance between the end members 5, 6, the cylinder formed by the interlocking disk members 7, 8, can be inserted between the end members. After such insertion, the disk members 7, 8, are slid endwise relatively to each other until the adjacent surfaces of the disk portions of the members 7, 8, coact. The disk members 7, 8, having been thus positioned, the ring 11, which has been previously inserted between the ends of the shafts 1, 2, is slipped over the flange 13 and the cap screws 12 are inserted, thus firmly locking the disk members 7, 8, together in proper position.

It will be noted that with the coupling assembled, the shoulders 14, 15, formed on the claws 9, 10, do not coact with the ends of the end members 6, 5, thus permitting a certain amount of end motion of the one shaft 1, 2, relative to the other. The claws 9, 10, moreover, coact loosely with the end members 6, 5, along the surfaces of revolution 16, 17, thus permitting a slight transverse motion of the shafts 1, 2, relative to each other. With these allowances for relative shifting of the shafts 1, 2, a flexible driving connection is obtained which will permit shifting of the shafts 1, 2, between certain predetermined limits, thus avoiding the accuracy required in ordinary alinement of the shafts 1, 2.

The lubrication of the coupling members during rotation of the shafts 1, 2, is accomplished with the aid of centrifugal force by means of the pockets 20 and conduits 21. The oil from the supporting bearings of the shafts 1, 2, flows along the shafts 1, 2, until it reaches the end members 5, 6, when it is forced outward by centrifugal force into the outer circular corners of the pockets 20. From these corners the oil flows through the conduits 21, being forced through the conduits by the action of centrifugal force, until it reaches the surfaces of coaction between the lugs 18, 19, and the claws 10, 9, respectively, thus providing a simple and efficient lubricating means.

The integral formation of the disk members 7, 8, and claws 9, 10, produces a construction which is easily manufactured as well as being durable and compact. It is, however, not essential that this construction be exactly as disclosed, since sectional members 7, 8, and claws 9, 10, of various modified forms might be substituted. The lugs 18, 19, might also be formed directly on the ends of the shafts 1, 2, without departure from the scope of the present invention. It should be generally understood that it is not desired to be limited to the exact details of construction shown and described, for obvious modifications will occur to a person skilled in the art.

It is claimed and desired to secure by Letters Patent,—

1. In a coupling, a plurality of substantially alined shafts, lugs projecting from each of said shafts, a plurality of coupling members intermediate said shafts, and claws projecting from each of said members and engaging said lugs, said claws of one of said members coacting directly with said claws of another of said members.

2. In a coupling, a plurality of substantially alined shafts, lugs projecting from each of said shafts, a plurality of coupling members intermediate said shafts, and claws projecting from each of said members and engaging said lugs, said claws of one of said members passing between and coacting directly with said claws of another of said members.

3. In a coupling, a plurality of substantially alined shafts, a lug projecting from each of said shafts, and a plurality of coupling members intermediate said shafts each having a claw and each of the claws engaging one of said lugs, said claw on one of said members directly engaging said claw on another of said members.

4. In a shaft coupling, a plurality of shafts having a space intermediate their ends, a lug projecting from each of said shafts, a plurality of coupling members between said shafts, and a claw on each of said members, said claw of each member projecting beyond another of the members and coacting with said lug on the shaft nearest said other member, and the overall length of each member being shorter than the distance between said shafts.

5. In a coupling, a plurality of shafts, a lug projecting from each of said shafts, a coupling member adjacent the end of each of said shafts, and a claw projecting from each of said members, the claw of one of said members engaging said lug on said shaft nearer another of said members, to form a direct driving connection between said member and said shaft.

6. In a coupling, a plurality of shafts having a space intermediate their ends, a lug projecting from each of said shafts, a coupling member within said space and adjacent the end of each of said shafts, and a claw projecting from each of said members and engaging said lug on said shaft nearer another of said members, said coupling members being removable through said space.

In testimony whereof, I affix my signature in the presence of two witnesses.

WILLIAM H. LIEBER.

Witnesses:
G. F. DE WEIN,
ELLA BRICKELL.